Dec. 9, 1969  E. V. GARNETT  3,482,660
TRAILER BRAKE CONTROL

Original Filed June 13, 1966  3 Sheets-Sheet 1

INVENTOR.
Edward V. Garnett
BY
Van Valkenburgh & Lowe
ATTORNEYS

Dec. 9, 1969   E. V. GARNETT   3,482,660
TRAILER BRAKE CONTROL
Original Filed June 13, 1966   3 Sheets-Sheet 2

INVENTOR.
Edward V. Garnett
BY
Van Valkenburgh & Lowe
ATTORNEYS

Dec. 9, 1969    E. V. GARNETT    3,482,660
TRAILER BRAKE CONTROL
Original Filed June 13, 1966    3 Sheets-Sheet 3

INVENTOR.
Edward V. Garnett
BY
Van Valkenburgh & Loewe
ATTORNEYS

United States Patent Office 3,482,660
Patented Dec. 9, 1969

3,482,660
TRAILER BRAKE CONTROL
Edward V. Garnett, Denver, Colo., assignor to Eaton Metal Products Company, Denver, Colo., a corporation of Nebraska
Original application June 13, 1966, Ser. No. 557,070, now Patent No. 3,379,392, dated Apr. 23, 1968. Divided and this application Jan. 8, 1968, Ser. No. 699,287.
Int. Cl. B60t 13/04, 7/20
U.S. Cl. 188—167                    4 Claims

ABSTRACT OF THE DISCLOSURE

A trailer brake control, particularly adapted for cable reel trailers, which trailer includes a brake at each rear wheel operated by a lever which is connected by a cable to a transverse balance plate moved forwardly by a spring, with a trip mechanism for resisting the spring and relieving tension of the cables, but causing the brakes to be set when tripped. A hand lever for resetting the brake trip is connected to the balance plate by a toggle link.

---

This application is a division of my copending application Ser. No. 557,070, filed June 13, 1966 now U.S. Patent No. 3,379,392.

This invention relates to brake controls for trailers particularly cable reel trailers.

Wire rope, power transmission lines, telephone cables, and like cables are often of a substantial length and are ordinarily wound upon flanged spool-like reels which may be quite large and heavy. When necessary to pay out cable, the reel is usually mounted and supported upon a horizontal shaft so it may rotate as the cable is pulled therefrom. For field use, a wheeled trailer may be adapted to carry and support a reel upon a shaft so that the reel will not have to be taken off the trailer when the cable is to be payed from it.

The invention of my aforesaid application Ser. No. 557,070 is an improved construction of an open-frame reel-supporting trailer and it features a vertical array of supports at each side of a vertically-movable frame which may receive and hold the ends of a shaft in a reel wher the frame is lowered, and which may be lifted once the reel-supporting shaft is set in position. This permits a heavy, cable-loaded reel of any diameter to be quickly mounted until it is actually in position in the trailer. The construction also features an individualized wheel-suspension system. In many instances the operation of unwinding reels must proceed in regions of rough terrain where the trailer cannot be set in a level position without special preparation, such as leveling the ground surface or building a special base structure. Such undesirable and time-consuming preparations are eliminated. Further, improvements in the trailer construction include a simplified arrangement of shock-absorbing spring means to permit it to travel over a rough road without excessive bouncing, simple adjustable outrigger arms to better hold the trailer in place once it is set for unwinding operations and an emergency brake system which may be manually operated or which may be associated with a tractor pulling the trailer.

Accordingly, the objects of the present invention are to provide a novel and improved trailer which is adapted to be securely held in position against the forces required to pay cable from the reel; and includes a simple arrangement of an emergency braking system associated with the wheels of the trailer.

With the foregoing and other objects in view, all of which more fully hereinafter appear, my invention comprises certain constructions, combinations and arrangements of parts and elements as hereinafter described, defined in the appended claims and illustrated in preferred embodiment in the accompanying drawings in which:

Figure 1:
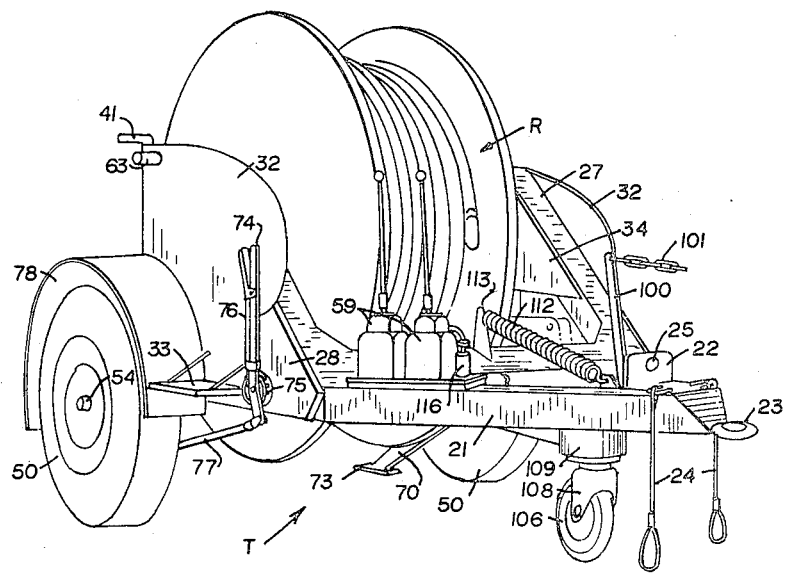
FIGURE 1 is a perspective view of an improved reel trailer embodying a brake control of this invention, looking towards the front, right side of the trailer, and with the trailer carrying loaded reel as in a position when the trailer is being used.
Figure 2:
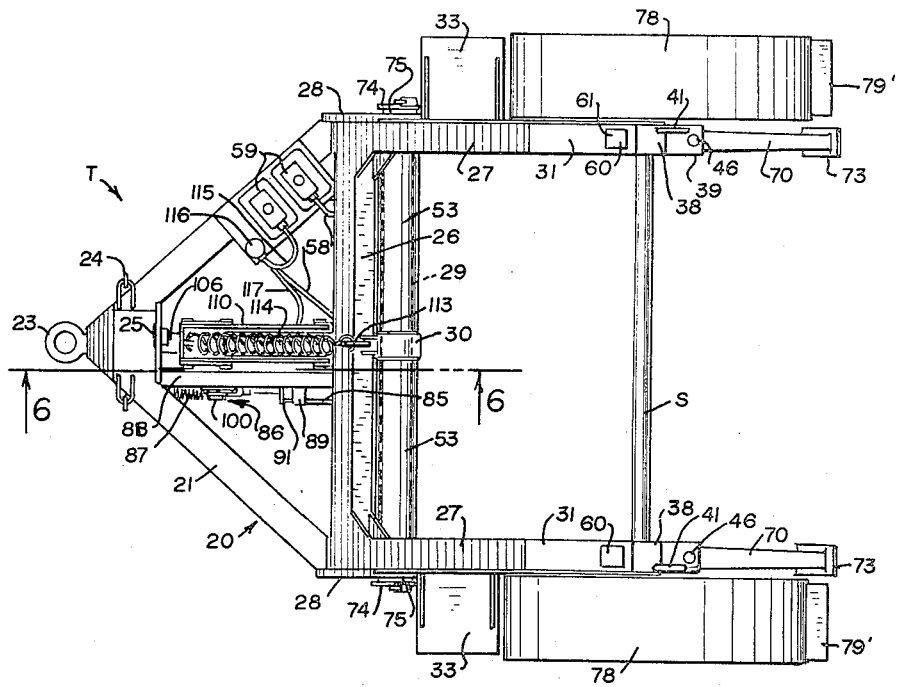
FIGURE 2 is a plan view of the trailer shown in FIG. 1 but with the reel being removed.
Figure 3:
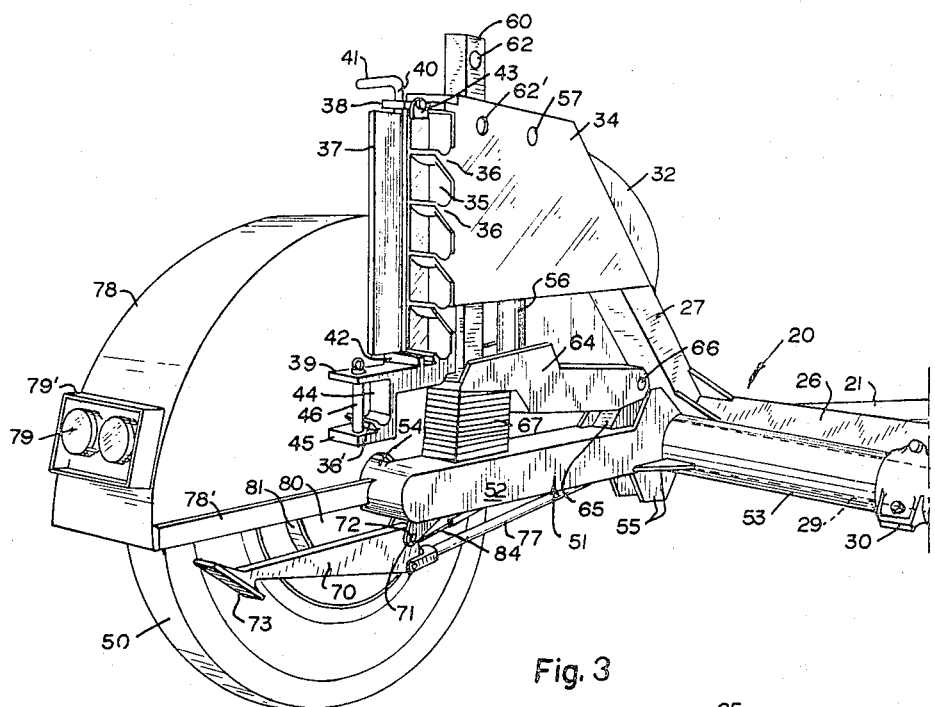
FIGURE 3 is a perspective view of the inner portion of the left side of the apparatus, as looking towards the rear of the apparatus.

Referring more particularly to the drawing, the reel trailer T is, in plan, in the general form of an enlarged wheel-mounted, Y-shaped yoke adapted to hold a reel R between the legs of the yoke. This yoke frame 20 is a structurally rigid arrangement of reinforced tubular members and plate members which are welded together according to regular shop practice. This frame 20 is symmetrical with respect to a vertical plane through the central longitudinal axis of the unit. A tongue 21 is formed by two forwardly converging, square-sectioned tubular frame members closed together at the forward end by a gusset plate 22. Conventional tractor connecting means are located at this front end including an eye 23, safety cables 24 and an electrical connector socket 25 on an upstanding portion of the gusset plate 23. The rearward ends of the tongue members 21 are spread apart by a transverse square sectioned tubular beam 26 to form the crotch of this yoke-shaped frame 20. Thence, a pair of spaced, parallel frame legs 27 extend rearwardly from the crotch, but upwardly out of the plane of the tongue members 21 at an angle of approximately 45 degrees. The legs 27, strong, square-sectioned tubular units, form the primary elements of a wide, slot-like cradle wherein a cable reel R of any normal size may be suspended, as upon an axle shaft S which extends through the reel so that its ends may be carried in sockets at the rearward end of the frame, as hereinafter described.

The crotch of the frame is reinforced by heavy gusset plates 28 at each outer side of the frame. Each gusset plate 28 is formed as a triangular member with a first, forward portion lapping the rear end of a tongue beam 21, a second portion extending rearwardly and upwardly to lap the front end of a leg 27 and a third portion being underneath the leg to provide a surface support for one end of a transversely disposed, rigid, tubular shaft 29. This shaft 29, positioned immediately behind the crotch beam 26, is of a comparatively large diameter and is adapted to hold a pair of rocker-beam-wheel support members as hereinafter described. The center of the shaft 29 is connected and secured to the central portion of the center frame by a connector 30 between the members.

Each rearwardly upsloped leg 27 is formed with a flat top portion 31 which holds lift members, described in said Patent No. 3,379,392. Also, reference is made to said patent for the construction and operation of the parts comprising cover plate 32, platform 33, inner plate 34, end plate 35, hooks 36, socket 36′, gates 37, lower plates 38 and 39, vertical shaft 40, handle 41, bar 42, detent 43, end plate 44, lowermost plate 45 and lock pin 46.

Figure 4:
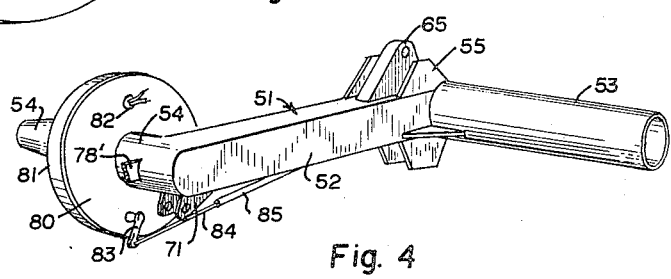
FIGURE 4 is a rear perspective view of a wheel-supporting rocker frame.

The trailer is carried upon a pair of conventional, rubber-tired wheels 50 which are sized and designed to support the entire weight of the trailer and any reel which may be loaded thereon. Each wheel is individually suspended on a rocker frame 51 such as illustrated at FIG. 4. Each rocker frame 51 includes a longitudinally-disposed beam 52, a structurally-rigid, square sectioned tube. An inwardly-extending, transversely-disposed bearing sleeve 53 is connected to the forward end of the beam 52 and is adapted to be pivotally mounted upon the frame shaft 29 to permit the beam 52 to swing about the shaft 29 in a vertical, longitudinal plane. Each sleeve 53 extends inwardly towards the center of the shaft 29 to abut against the central connector 30 and it is to be noted that any suitable arrangement of internal bearings and lubricating means may be used within this sleeve to provide easy motion of the rocker frame about the shaft 30.

An outwardly-extending, lateral wheel spindle 54 outstands from the rearward end of the beam 52 at a position beyond the frame cover plate 32 to dispose the wheel 50 outwardly of the frame of the apparatus. A considerable weight is carried upon this apparatus and it is to be noted that each longitudinally-disposed frame member 51 must be able to resist the torsional effect of the load on this offset wheel spindle, necessarily at one side of the beam 52. Accordingly, the connection of the beam 52 to the sleeve 53 is reinforced by suitable gusset plates 55.

Again, reference is made to said Patent No. 3,379,392, for the construction and operation of the parts comprising hydraulic jack 56, pin 57, pressure line 58, pump 59, lock bar 60, socket 61, holes 62, hole 62′, lock pin 63, arm 64, lug 65 and pad 67.

In order to hold the trailer when it is to be parked for reel unwinding operations, wheel brakes are provided as will be described. Again, reference is made to said Patent No. 3,379,392 for the construction and operation of the parts comprising outrigger arm 70, ears 71, contact shoe 73, hand lever 74, pivot head 75, link 77, fender 78, rod 78′, travel and signal lights 79 and box 79′.

Each rocker frame 50 includes a brake disc 80 on the spindle 54. This disc 80 is adapted to be closed by the wheel brake drum 81 and the disc carries actuator mechanisms and brake shoes, not shown, which are adapted to coact to move the shoes against wheel brake drums. It is contemplated that an electrically-operated brake will be used on the trailer since electrical leads 82 at the disc may be easily connected with a controlled power supply at the towing vehicle as through the connector socket 25. Such a brake is a conventional, common unit and it will also include a supplementary, mechanical brake means operated by pulling or releasing a small lever 83 outstanding from the bottom disc 80, as in FIG. 4.

Figure 5:
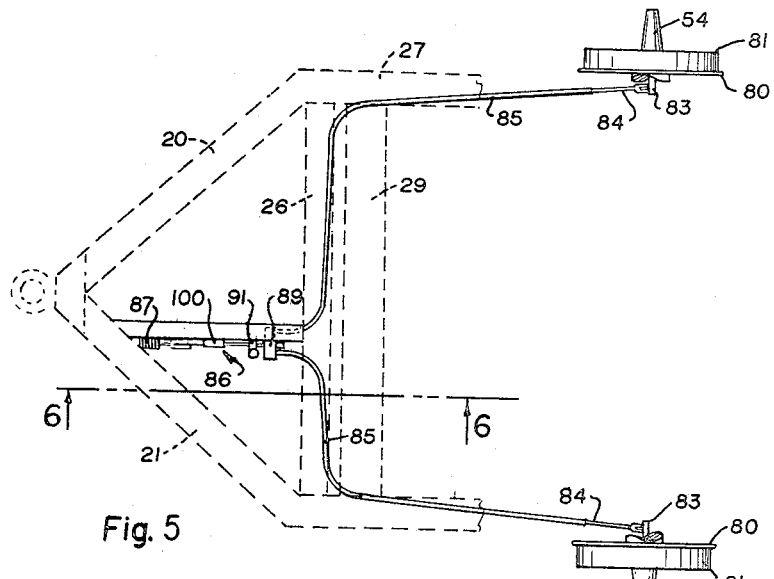
FIGURE 5 is a diagrammatic plan view outlining portions of the frame in broken lines, and illustrating in full lines the emergency brake system of the unit.
Figure 6:
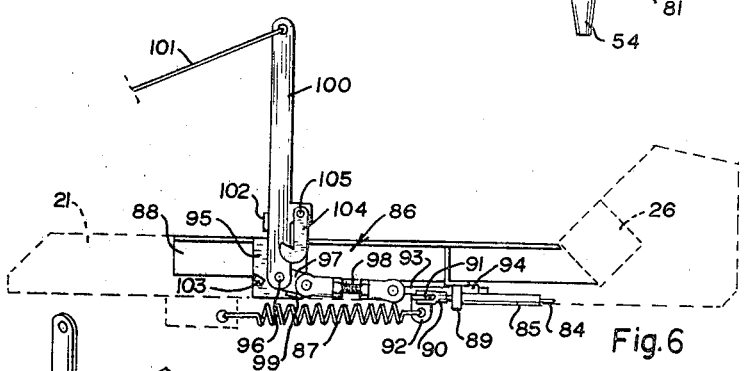
FIGURE 6 is a side elevational view of the emergency brake trip assembly, as taken from the indicated line 6—6 at FIG. 5 but on an enlarged scale.
Figure 7:
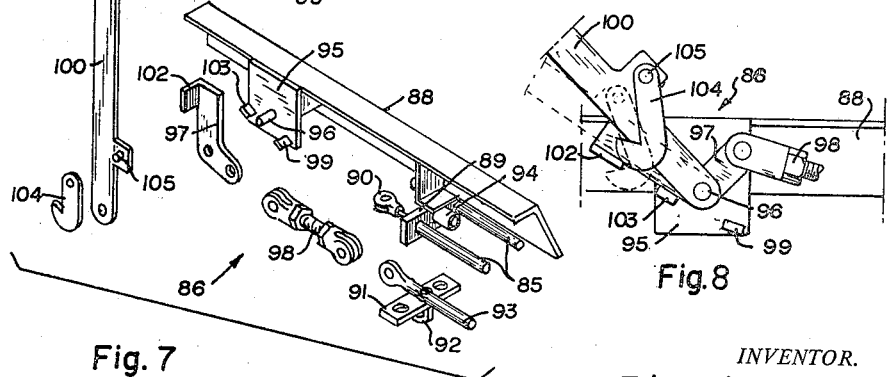
FIGURE 7 is an isometric exploded view of certain components constituting the emergency brake trip assembly shown at FIG. 6.

In accordance with this invention, lever 83 of each brake disc 80 is used for a mechanically-operated emergency braking system in the reel trailer unit. To form this system each lever 83 is connected to a flexible cable 84 which is encased within a sheath tube 85 to extend forwardly to the front of the apparatus as in the manner shown in FIG. 5. There, the cables 84 connect with a trip lock mechanism 86 and a tension spring 87. When the trip lock 86 is released, the spring 87 pulls the levers 83 of both wheel discs to set the mechanical brakes. As illustrated in FIG. 5, each sheath tube 85 extends forwardly from the brake and turns inwardly at the crotch beam 26 to again extend forwardly to opposite sides of the trip lock mechanism 86 alongside a supporting member 88. This support member 88 is illustrated as a structural angle member held longitudinally between a tongue member 21 and a crotch beam 26 but at one side of the longitudinal center line of the unit to provide clearance for a front wheel which will be hereinafter described.

The forward ends of the sheath tubes 85 terminate in a short transverse block 89 mounted underneath the support bar 88, the block 89 including a pair of spaced holes into which the ends of the sheath tubes 85 fit with the ends of the cable extending through the block. They terminate as a pair of clevises 90, as in FIGS. 12 and 13. These spaced clevises are pivotally connected to a short transverse balance plate 91 having a centrally positioned lug 92 at its underside which connects with the spring 87 so that the forward pull of the spring 87 will set both brakes with the balance plate rotating to pull both cables evenly if the adjustments of the cables are not precisely the same.

The trip lock mechanism 86 is adapted to normally restrain the pull of the spring 87 by pushing against an eyebar 93 pivotally attached to the top of the balance plate 91 with a portion thereof extending rearwardly of the plate 91 and into a guide sleeve 94 at the center of the block 89. This sleeve permits a longitudinal shifting of the eyebar 93 and the balance plate attached thereto, but otherwise holds the assembly in place.

The trip mechanism 86 is mounted upon a plate 95 at the side of the support bar 88 and forwardly of the eyebar 93. This mechanism is carried upon a pivot 96 outstanding from the face of the plate and includes a short flat elbow 97 mounted on this pivot 96. The elbow 97 has a lower leg extending rearwardly towards the eyebar 93 and is connected thereto by a toggle link 98. The toggle link 98, a pair of opposing clevis heads adjustably mounted upon a short threaded bar, pivotally connect with the lower leg of the elbow 97 and the eyebar 93, and is of such a length as to properly tension the spring 87 when the leg of the elbow 97 is rotated downwardly to place the arm and the link in a common alignment. The leg is adapted to rotate downwardly a short distance past this point of common alignment to contact a stop lug 99 on the plate 95, at which position the pull of the spring holds the assembly in place, as illustrated in FIG. 12. Upward rotation of the leg, on the other hand, causes the leg and eyebar to buckle together to permit the spring 87 to pull the brake cables.

Figure 8:
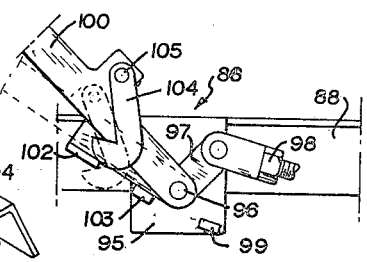
FIGURE 8 is a fragmentary portion of the showing at FIG. 6 but on an enlarged scale and with the components illustrated as being shifted to an alternate brake-locking position.

The elbow 97 includes an upper leg which is conveniently vertical when the lower leg is against the stop lug 99. A lever 100 is mounted on the pivot 96 to normally stand alongside the upright leg and to extend above the level of the tongue frame to a position where it is easily reached. A chain or cord 101 may be connected to this lever to be extended forwardly, as for connection to a towing tractor or to an anchor. If the trailer commences to roll backwards or is accidently released, a pull of the cord 101 will rotate the lever 100. The lever 100 may also be pulled manually to set the brakes. Interconnection of the elbow 97 with this lever 100 is by an offset lug 102 at the forward side of the upright leg of the elbow, so that any forward pull of the lever engages this lug, to rotate the elbow upwardly and move the lower leg upwardly and past alignment with the toggle link 98 to buckle the toggle and arm as explained. The compression of the spring snaps the lower leg and eyebar upwardly to the position illustrated at FIG. 8 and a stop 103 on the plate 95 limits this rotation. The lever 100 may then fall to any position or remain upright depending upon its tightness upon the pivot 96. To reset the apparatus the lever includes a hook 104 carried on a laterally offset pivot 105 which will swing over the edge of the lug 102 when the lever is moved forwardly and downwardly.

Again, reference is made to said Patent No. 3,379,392 for the construction and operation of the parts comprising caster wheel 106, yoke 108, head 109, linkage 110, spring 112, arm 113, jack 114, hydraulic line 115, shut-off valve 116 and supplementary line 117.

I have now described my invention in considerable detail. However, it is obvious that others skilled in the art can devise and build alternate and equivalent constructions which are nevertheless within the spirit and scope of my invention. Hence, I desire that my protection be limited only by the proper scope of the appended claims.

What is claimed is:

1. In a trailer:

a frame;

a pair of wheels for said frame;

a brake at each wheel including a lever for each brake adapted to be pulled to apply the brake;

a cable extending from each brake lever to a point remote therefrom;

a transverse balance plate having each end thereof connecting with the opposite end of each cable;

a tensed spring connecting with the central portion of the balance plate and adapted to pull the plate and cables attached thereto; and a trip mechanism adapted to be set to hold and to resist the pull of the spring and eliminate tension on the cables but to be tripped to release the spring and thereby set the brakes.

2. In a trailer as defined in claim 1, wherein said trip mechanism includes:

a lever arm mounted upon a pivot;

a toggle link connecting with the arm and with the balance plate, with the arm and link being adapted to rotate to a common alignment when the spring is held against its tension;

a stop adapted to limit the movement of the arm and toggle link to a short distance past the center position when the arm is rotated in one direction to lock the system; and means for rotating the arm in the opposite direction to release the same.

3. In a trailer as defined in claim 2, including:

an operating handle mounted on said pivot, said lever arm being formed as an elbow-shaped member having a portion adapted to lie alongside said operating handle; and a lug on one of said portions and said handle adapted to contact the other when said handle is moved to pivot said lever arm to a toggle-releasing position.

4. In a trailer as defined in claim 1, wherein:

said trailer is a cable reel trailer having a frame providing a yoke having sides between which a cable reel is supported for transportation by said trailer and a pair of rear wheels on opposite sides of said frame; and said cables extend from said brake levers to a position forwardly therefrom.

References Cited

UNITED STATES PATENTS

| 1,185,109 | 5/1916 | Leach | 188—167 |
| 3,190,401 | 6/1965 | Bigley et al. | 188—167 |
| 3,379,392 | 4/1968 | Garnett | 242—86.5 |

NATHAN L. MINTZ, Primary Examiner